United States Patent
Lin et al.

(10) Patent No.: US 10,462,484 B2
(45) Date of Patent: Oct. 29, 2019

(54) VIDEO ENCODING METHOD AND APPARATUS WITH SYNTAX ELEMENT SIGNALING OF EMPLOYED PROJECTION LAYOUT AND ASSOCIATED VIDEO DECODING METHOD AND APPARATUS

(71) Applicant: MEDIATEK INC., Hsin-Chu (TW)

(72) Inventors: Jian-Liang Lin, Yilan County (TW); Hung-Chih Lin, Nantou County (TW); Chia-Ying Li, Taipei (TW); Shen-Kai Chang, Hsinchu County (TW); Chi-Cheng Ju, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/772,818

(22) PCT Filed: Sep. 30, 2017

(86) PCT No.: PCT/CN2017/104849
§ 371 (c)(1),
(2) Date: May 2, 2018

(87) PCT Pub. No.: WO2018/064967
PCT Pub. Date: Apr. 12, 2018

(65) Prior Publication Data
US 2018/0332305 A1 Nov. 15, 2018

Related U.S. Application Data

(60) Provisional application No. 62/405,290, filed on Oct. 7, 2016.

(51) Int. Cl.
*H04N 19/597* (2014.01)
*H04N 19/184* (2014.01)
(Continued)

(52) U.S. Cl.
CPC ............. *H04N 19/597* (2014.11); *G06K 9/36* (2013.01); *H04N 19/184* (2014.11); *H04N 19/70* (2014.11); *H04N 19/91* (2014.11)

(58) Field of Classification Search
None
See application file for complete search history.

(56) References Cited

U.S. PATENT DOCUMENTS 6,141,034 A    10/2000  McCutchen
6,144,773 A    11/2000  Kolarov
(Continued)

FOREIGN PATENT DOCUMENTS

CN      1491403 A      4/2004
CN    101606177 A     12/2009
(Continued)

OTHER PUBLICATIONS

"International Search Report" dated Dec. 28, 2017 for International application No. PCT/CN2017/104849, International filing date:Sep. 30, 2017.
(Continued)

*Primary Examiner* — Christopher Braniff
(74) *Attorney, Agent, or Firm* — Winston Hsu

(57) ABSTRACT

A video encoding method includes: setting a 360-degree Virtual Reality (360 VR) projection layout of projection faces, wherein the projection faces have a plurality of triangular projection faces located at a plurality of positions in the 360 VR projection layout, respectively; encoding a frame having a 360-degree image content represented by the projection faces arranged in the 360 VR projection layout to generate a bitstream; and for each position included in at least a portion of the positions, signaling at least one syntax element via the bitstream, wherein the at least one syntax element is set to indicate at least one of an index of a
(Continued)

triangular projection view filled into a corresponding triangular projection face located at the position and a rotation angle of content rotation applied to the triangular projection view filled into the corresponding triangular projection face located at the position.

20 Claims, 12 Drawing Sheets

(51) Int. Cl.
*H04N 19/91* (2014.01)
*H04N 19/70* (2014.01)
*G06K 9/36* (2006.01)

(56) References Cited

U.S. PATENT DOCUMENTS

| | | | |
|---|---|---|---|
| 6,466,254 | B1 | 10/2002 | Furlan |
| 2004/0105597 | A1 | 6/2004 | Lelescu |
| 2006/0251336 | A1 | 11/2006 | Lelescu |
| 2006/0257032 | A1* | 11/2006 | Nakagawa ............... G06T 17/20 382/232 |
| 2009/0123088 | A1 | 5/2009 | Kallay |
| 2010/0001997 | A1 | 1/2010 | Kajikawa |
| 2010/0086023 | A1 | 4/2010 | Cheung |
| 2013/0185353 | A1 | 7/2013 | Rondao Alface |
| 2015/0341552 | A1 | 11/2015 | Chen |
| 2016/0071240 | A1 | 3/2016 | Liu |
| 2016/0142697 | A1 | 5/2016 | Budagavi |
| 2017/0155797 | A1 | 6/2017 | Otani |
| 2017/0358126 | A1 | 12/2017 | Lim |
| 2018/0075576 | A1 | 3/2018 | Liu |
| 2018/0158170 | A1 | 6/2018 | Lin |
| 2018/0225876 | A1 | 8/2018 | Lim |
| 2018/0262775 | A1 | 9/2018 | Lee |
| 2019/0026858 | A1 | 1/2019 | Lin |

FOREIGN PATENT DOCUMENTS

| | | |
|---|---|---|
| CN | 101853621 A | 10/2010 |
| CN | 102481487 A | 5/2012 |
| CN | 102938018 A | 2/2013 |
| CN | 105164998 A | 12/2015 |
| CN | 105898254 A | 8/2016 |
| CN | 105898359 A | 8/2016 |
| EP | 3 446 282 A1 | 2/2019 |
| JP | 2016-42629 A | 3/2016 |
| TW | 201101077 A1 | 1/2011 |
| TW | 201633104 A | 9/2016 |
| WO | 2016140082 A1 | 9/2016 |

OTHER PUBLICATIONS

"International Search Report" dated Dec. 28, 2017 for International application No. PCT/CN2017/104745, International filing date:Sep. 30, 2017.

Zhang, Chunxiao et al., Intermediate Cubic-Panorama Synthesis Based on Triangular Re-Projection, Proceedings of 2010 IEEE 17th International Conference on Image Processing, p. 3985-3988., Sep. 29, 2010.

"International Search Report" dated Feb. 24, 2018 for International application No. PCT/CN2017/114681, International filing date:Dec. 6, 2017.

Lin, Title of Invention: Method and Apparatus for Generating Projection-Based Frame With 360-Degree Image Content Represented by Triangular Projection Faces Assembled in Octahedron Projection Layout, U.S. Appl. No. 15/769,750, filed Apr. 20, 2018.

Aljoscha Smolić and David McCutchen,"3DAV Exploration of Video-Based Rendering Technology in MPEG", IEEE Transactions on Circuits and Systems for Video Technology, vol. 14, No. 3, Mar. 2004, pp. 348-356.

Thomas Engelhardt et al., Octahedron Environment Maps, VMV 2008, http://www.vis.uni-stuttgart.de/~engelhts/paper/vmvOctaMaps.pdf, XP055432198, Jan. 1, 2008.

Emil Praun et al., Spherical Parametrization and Remeshing, Jul., 2003, pp. 340-349, XP058134301.

* cited by examiner

VIDEO ENCODING METHOD AND APPARATUS WITH SYNTAX ELEMENT SIGNALING OF EMPLOYED PROJECTION LAYOUT AND ASSOCIATED VIDEO DECODING METHOD AND APPARATUS

CROSS REFERENCE TO RELATED APPLICATIONS

This application claims the benefit of U.S. provisional application No. 62/405,290, filed on Oct. 7, 2016 and incorporated herein by reference.

BACKGROUND

The present invention relates to video encoding and video decoding, and more particularly, to video encoding method and apparatus with syntax element signaling of an employed projection layout and associated video decoding method and apparatus.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional video corresponding to a viewing sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

In general, the omnidirectional video corresponding to a viewing sphere is transformed into a frame with a 360-degree image content represented by projection faces arranged in a 360-degree Virtual Reality (360 VR) projection layout, and then the resulting frame is encoded into a bitstream for transmission. If a configuration of the employed 360 VR projection layout is fixed without allowing any adjustments made thereto, the video encoder has less flexibility for encoding the 360-degree image content. Thus, there is a need for a flexible video encoder design which is allowed to determine/select a 360 VR projection layout and signal syntax element(s) associated with the employed 360 VR projection layout to a video decoder.

SUMMARY

One of the objectives of the claimed invention is to provide video encoding method and apparatus with syntax element signaling of an employed projection layout and associated video decoding method and apparatus.

According to a first aspect of the present invention, an exemplary video encoding method is disclosed. The exemplary video encoding method includes: setting a 360-degree Virtual Reality (360 VR) projection layout of projection faces, wherein the projection faces comprise a plurality of triangular projection faces located at a plurality of positions in the 360 VR projection layout, respectively; encoding a frame having a 360-degree image content represented by the projection faces arranged in the 360 VR projection layout to generate a bitstream; and for each position included in at least a portion of the positions, signaling at least one syntax element via the bitstream, wherein the at least one syntax element is set to indicate at least one of an index of a triangular projection view filled into a corresponding triangular projection face located at said each position and a rotation angle of content rotation applied to the triangular projection view filled into the corresponding triangular projection face located at said each position.

According to a second aspect of the present invention, an exemplary video encoding method is disclosed. The exemplary video encoding method includes: encoding a frame having a 360-degree image content represented by projection faces arranged in a 360-degree Virtual Reality (360 VR) projection layout to generate a bitstream, wherein the projection faces comprise a plurality of triangular projection faces; and signaling a first syntax element via the bitstream, wherein when a predefined projection layout is selected and used as the 360 VR projection layout, the first syntax element is set to indicate selection of the predefined projection layout.

According to a third aspect of the present invention, an exemplary video decoding method is disclosed. The exemplary video decoding method includes: receiving a bitstream; processing the bitstream to obtain at least one syntax element for each position included in at least a portion of a plurality of positions; referring to at least syntax elements obtained for said at least a portion of the positions to determine a 360-degree Virtual Reality (360 VR) projection layout of projection faces, wherein the projection faces comprise a plurality of triangular projection faces located at the positions in the 360 VR projection layout, respectively, and the at least one syntax element indicates at least one of an index of a triangular projection view filled into a corresponding triangular projection face located at said each position and a rotation angle of content rotation applied to the triangular projection view filled into the corresponding triangular projection face located at said each position; and decoding the bitstream to generate a decoded frame having a 360-degree image content represented by the projection faces arranged in the 360 VR projection layout.

According to a fourth aspect of the present invention, an exemplary video decoding method is disclosed. The exemplary video decoding method includes: receiving a bitstream; processing the bitstream to obtain a first syntax element; referring to at least the first syntax element to determine a 360-degree Virtual Reality (360 VR) projection layout of projection faces, wherein the projection faces comprise a plurality of triangular projection faces, and when a predefined projection layout is selected and used as the 360 VR projection layout, the first syntax element indicates selection of the predefined projection layout; and decoding the bitstream to generate a decoded frame having a 360-degree image content represented by the projection faces arranged in the 360 VR projection layout.

According to a fifth aspect of the present invention, an exemplary video encoder is disclosed. The exemplary video encoder includes a control circuit and an encoding circuit. The control circuit is arranged to set a 360-degree Virtual Reality (360 VR) projection layout of projection faces, wherein the projection faces comprise a plurality of triangular projection faces located at a plurality of positions in the 360 VR projection layout, respectively. The encoding circuit is arranged to encode a frame having a 360-degree image content represented by the projection faces arranged in the 360 VR projection layout to generate a bitstream, wherein for each position included in at least a portion of the positions, the encoding circuit further signals at least one syntax element via the bitstream, where the at least one syntax element is set to indicate at least one of an index of a triangular projection view filled into a corresponding triangular projection face located at said each position and a rotation angle of content rotation applied to the triangular projection view filled into the corresponding triangular projection face located at said each position.

According to a sixth aspect of the present invention, an exemplary video decoder is disclosed. The exemplary video decoder includes a control circuit and a decoding circuit. The decoding circuit is arranged to receive a bitstream, process the bitstream to obtain at least one syntax element for each position included in at least a portion of a plurality of positions, and decode the bitstream to generate a decoded frame having a 360-degree image content represented by projection faces arranged in a 360-degree Virtual Reality (360 VR) projection layout. The control circuit is arranged to refer to at least syntax elements obtained for said at least a portion of the positions to determine the 360 VR projection layout of the projection faces, wherein the projection faces comprise a plurality of triangular projection faces located at the positions in the 360 VR projection layout, respectively, and the at least one syntax element indicates at least one of an index of a triangular projection view filled into a corresponding triangular projection face located at said each position and a rotation angle of content rotation applied to the triangular projection view filled into the corresponding triangular projection face located at said each position.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
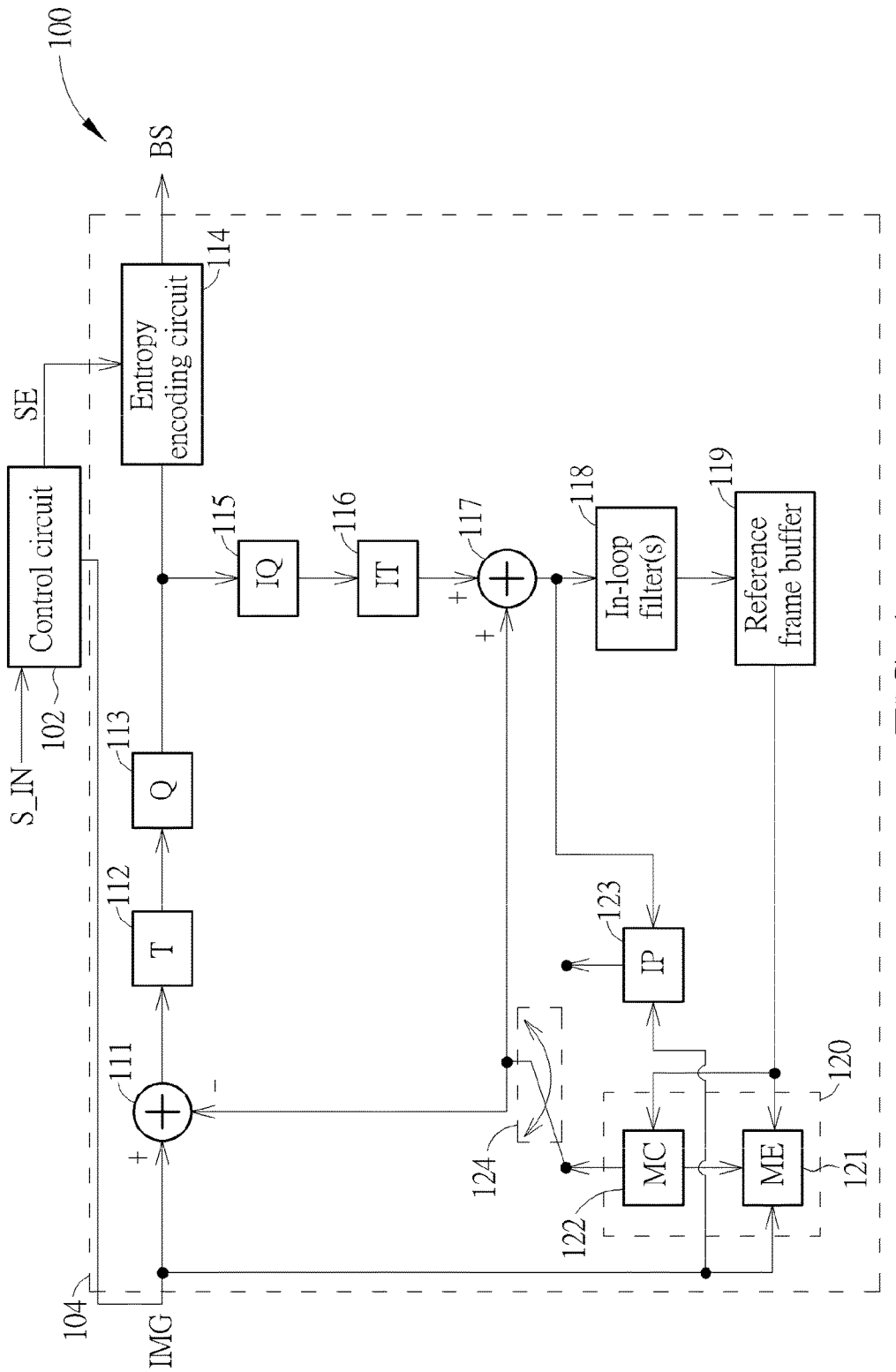
FIG. 1 is a diagram illustrating a video encoder according to an embodiment of the present invention.

FIG. 1 is a diagram illustrating a video encoder according to an embodiment of the present invention. The video encoder 100 includes a control circuit 102 and an encoding circuit 104. It should be noted that the video encoder architecture shown in FIG. 1 is for illustrative purposes only, and is not meant to be a limitation of the present invention. For example, the architecture of the encoding circuit 104 may vary, depending upon the coding standard. The control circuit 102 receives an omnidirectional video S_IN corresponding to a viewing sphere, and transforms the omnidirectional video S_IN into a frame IMG with a 360-degree image content represented by projection faces arranged in a 360-degree Virtual Reality (360 VR) projection layout. For example, the omnidirectional video S_IN may be generated from a video capture device such as an omnidirectional camera. The encoding circuit 104 encodes the frame IMG (which has the 360-degree image content represented by the projection faces arranged in the 360 VR projection layout) to generate a bitstream BS. As shown in FIG. 1, the encoding circuit 104 includes a residual calculation circuit 111, a transform circuit (denoted by "T") 112, a quantization circuit (denoted by "Q") 113, an entropy encoding circuit (e.g., a variable length encoder) 114, an inverse quantization circuit (denoted by "IQ") 115, an inverse transform circuit (denoted by "IT") 116, a reconstruction circuit 117, at least one in-loop filter 118, a reference frame buffer 119, an inter prediction circuit 120 (which includes a motion estimation circuit (denoted by "ME") 121 and a motion compensation circuit (denoted by "MC") 122), an intra prediction circuit (denoted by "IP") 123, and an intra/inter mode selection switch 124. Since basic functions and operations of these circuit components implemented in the encoding circuit 104 are well known to those skilled in the pertinent art, further description is omitted here for brevity.

The major difference between the video encoder 100 and a typical video encoder is that the control circuit 102 is used to determine/select the 360 VR projection layout, and is further used to set one or more syntax elements (SEs) associated with the determined/selected 360 VR projection layout, where the syntax element(s) associated with the determined/selected 360 VR projection layout are signaled to a video decoder via the bitstream BS generated from the entropy encoding circuit 114. In other words, the 360 VR projection layout employed by the video encoder 100 is not fixed, and is allowed to be adjusted by the video encoder 100. Hence, the video encoder 100 has more flexibility for encoding the 360-degree image content. Further details will be described later.

Figure 2:
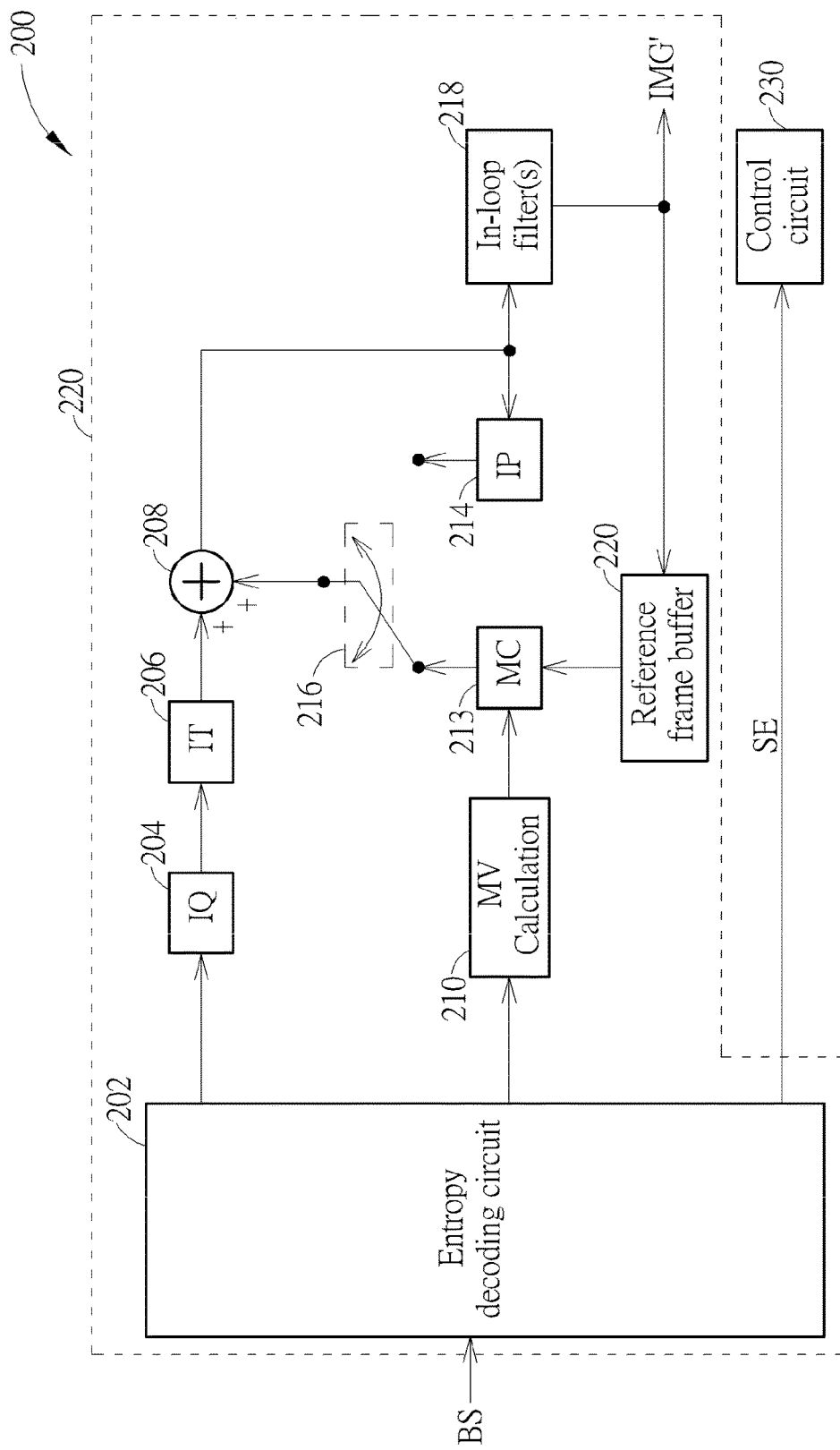
FIG. 2 is a diagram illustrating a video decoder according to an embodiment of the present invention.

FIG. 2 is a diagram illustrating a video decoder according to an embodiment of the present invention. The video decoder 200 may communicate with a video encoder (e.g., video encoder 100 shown in FIG. 1) via a transmission means such as a wired/wireless communication link or a storage medium. In this embodiment, the video decoder 200 receives the bitstream BS, and decodes the received bitstream BS to generate a decoded frame IMG'. For example, image contents carried by the decoded frame IMG' may be displayed on a display device such as a head-mounted display. As shown in FIG. 2, the video decoder 200 includes a decoding circuit 220 and a control circuit 230. It should be noted that the video decoder architecture shown in FIG. 2 is for illustrative purposes only, and is not meant to be a limitation of the present invention. For example, the architecture of the decoding circuit 220 may vary, depending upon the coding standard. The decoding circuit 220 includes an entropy decoding circuit (e.g., a variable length decoder) 202, an inverse quantization circuit (denoted by "IQ") 204, an inverse transform circuit (denoted by "IT") 206, a reconstruction circuit 208, a motion vector calculation circuit (denoted by "MV Calculation") 210, a motion compensation circuit (denoted by "MC") 213, an intra prediction circuit (denoted by "IP") 214, an intra/inter mode selection switch 216, at least one in-loop filter 218, and a reference frame buffer 220. In this embodiment, the frame IMG to be encoded by the video encoder 100 has a 360-degree image content represented by projection faces arranged in the 360 VR projection layout that is set/selected by the control circuit 102. Hence, after the bitstream BS is decoded by the video decoder 200, the decoded frame (i.e., reconstructed frame) IMG' also has a 360-degree image content represented by projection faces arranged in the same 360 VR projection layout that is set/selected by the control circuit 102. Since basic functions and operations of these circuit components implemented in the decoding circuit 220 are well known to those skilled in the pertinent art, further description is omitted here for brevity.

The major difference between the video decoder 200 and a typical video decoder is that the entropy decoding circuit 202 is further used to process the bitstream BS to obtain syntax element(s) associated with the 360 VR projection layout that is set/selected by control circuit 102, and outputs the obtained syntax element(s) to the control circuit 230. Hence, the control circuit 230 of the video decoder 200 can refer to the obtained syntax element(s) to determine the 360 VR projection layout that is set/selected by the control circuit 102 of the video encoder 100. In other words, after determining the 360 VR projection layout set/selected by the control circuit 102 of the video encoder 100, the control circuit 230 knows how the 360-degree image content is arranged in the decoded frame (i.e., reconstructed frame) IMG'.

The projection faces of the 360 VR projection layout set/selected by the video encoder 100 include a plurality of triangular projection faces. For example, the 360 VR projection layout may be a triangle-based projection layout, such as a tetrahedron projection layout, an octahedron projection layout, an icosahedron projection layout, a tetragon quartz-based projection layout, or a hexagon quartz-based projection layout.

In some embodiments of the present invention, after the 360 VR projection layout (e.g., a triangle-based projection layout) is determined based on the syntax element(s) derived from the bitstream, the decoded frame (i.e., reconstructed frame) IMG' with the 360-degree image content represented by projection faces of the 360 VR projection layout (e.g., a triangle-based projection layout) employed by the video encoder 100 may be further converted into a frame with a 360-degree image content represented by projection faces of a different 360 VR projection layout (e.g., an equirectangular projection (ERP) layout). For example, the control circuit 230 may have a post-processing function that is capable of applying post-processing (e.g., 360 VR projection layout conversion) to the decoded frame IMG' according to the 360 VR projection layout determined based on the syntax elements derived from the bitstream. However, this is for illustrative purposes only, and is not meant to be a limitation of the present invention.

Figure 3:
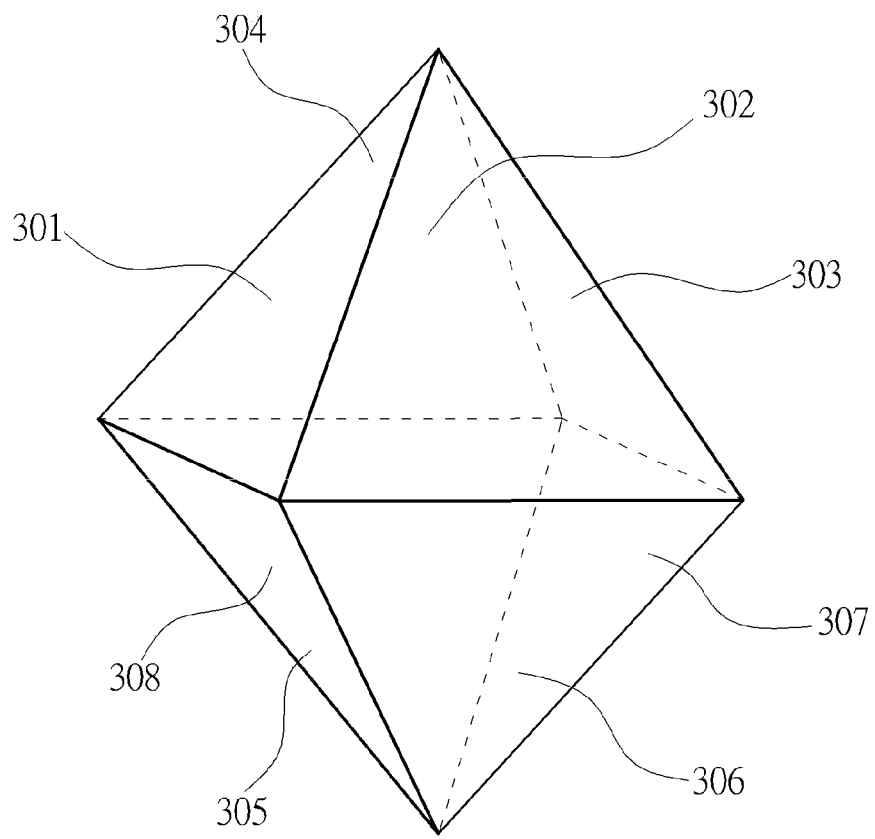
FIG. 3 is a diagram illustrating triangular projection views that will be filled into triangular projection faces of an octahedron projection layout under control of a control circuit shown in FIG. 1.

FIG. 3 is a diagram illustrating triangular projection views that will be filled into triangular projection faces of an octahedron projection layout under control of the control circuit 102 shown in FIG. 1. The triangular projection views 301-308 are derived from projections of an omnidirectional video corresponding to a viewing sphere that may be generated from, for example, an omnidirectional camera. Specifically, the triangular projection views 301-304 are associated with a first half of the viewing sphere, and the triangular projection views 305-308 are associated with a second half of the viewing sphere. Hence, the image content of the first half of the viewing sphere is properly projected onto four triangular planes to form the triangular projection views 301-304, and the image content of the second half of the viewing sphere is properly projected onto four triangular planes to form the triangular projection views 305-308.

Figure 4:
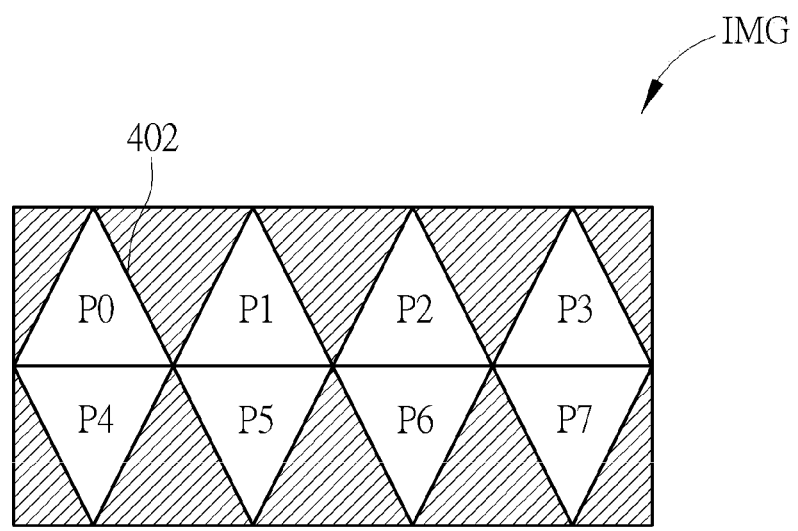
FIG. 4 is a diagram illustrating an octahedron projection layout according to an embodiment of the present invention.

FIG. 4 is a diagram illustrating an octahedron projection layout according to an embodiment of the present invention. In this embodiment, the octahedron projection layout 402 includes eight triangular projection faces located at different positions P0-P7, respectively. A 360-degree image content (which may be captured by an omnidirectional camera) is represented by image contents filled in the triangular projection faces. In accordance with the octahedron projection layout 402, the eight triangular faces P0-P7 are properly packed to form the frame IMG to be encoded by the encoding circuit 104.

In an exemplary flexible video encoder design which is capable of setting the configuration of the octahedron projection layout 402, the control circuit 102 determines the mapping between the triangular projection views 301-308 shown in FIG. 3 and the triangular projection faces located at different positions P0-P7 shown in FIG. 4, and/or determines the rotation angles of content rotation applied to the triangular projection views 301-308 filled into the triangular projection faces; and the encoding circuit 104 (particularly, the entropy encoding circuit 114) signals the final configuration of the octahedron projection layout 402 to a video decoder (e.g., video decoder 200) via the bitstream BS. For example, regarding each position included in at least a portion (i.e., part or all) of the positions P0-P7, the encoding circuit 104 signals at least one syntax element via the bitstream BS, wherein the at least one syntax element is set by the control circuit 102 to indicate at least one of an index of a triangular projection view filled into a corresponding triangular projection face located at the position and a rotation angle of content rotation applied to the triangular projection view filled into the corresponding triangular projection face located at the position.

Figure 5:
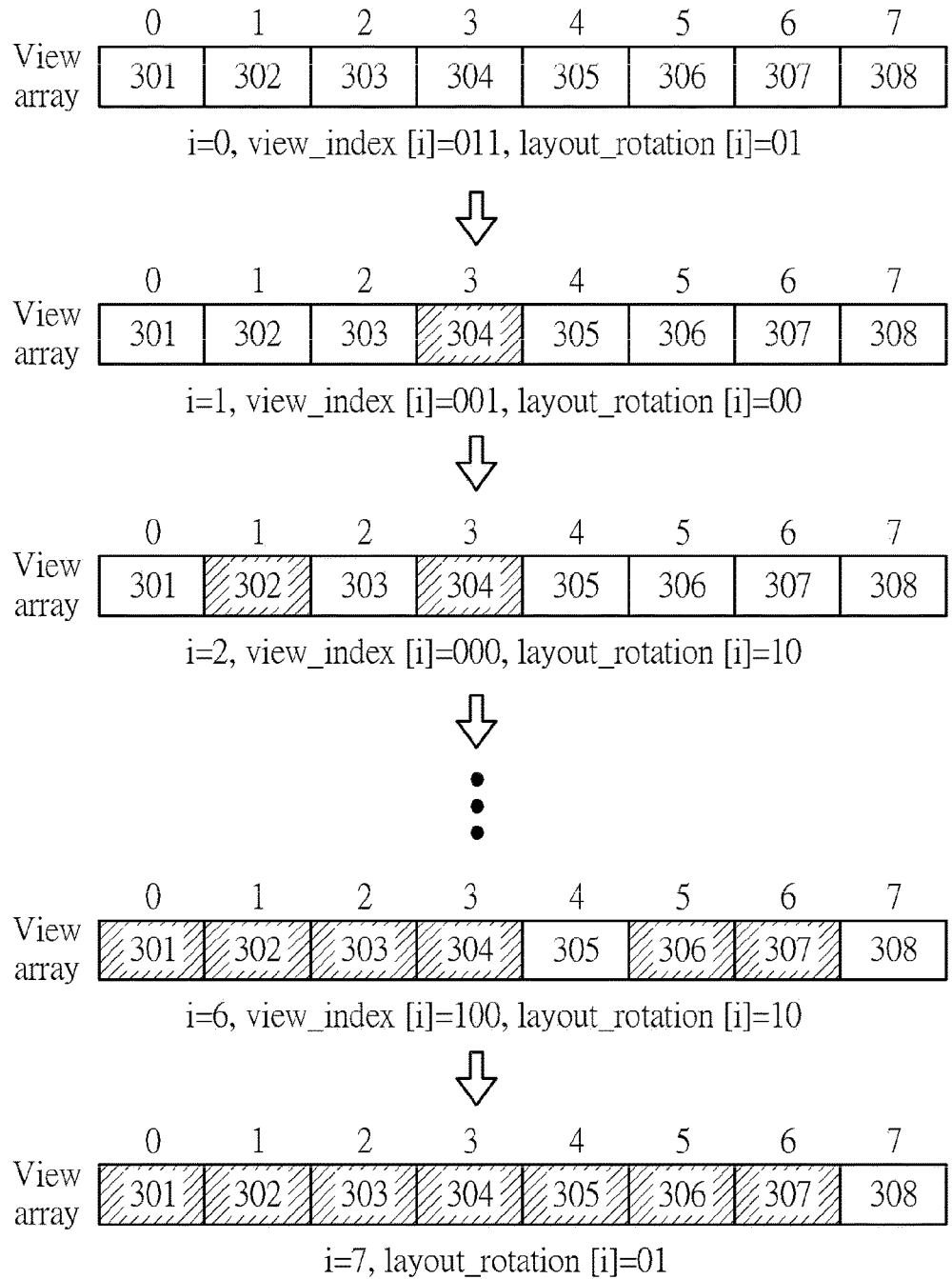
FIG. 5 is a diagram illustrating a procedure of setting a configuration of an octahedron projection layout according to an embodiment of the present invention.

FIG. 5 is a diagram illustrating a procedure of setting the configuration of the octahedron projection layout 402 according to an embodiment of the present invention. Initially, the control circuit 102 builds a view array of triangular projection views 301-308 in a predefined order. An order of the triangular projection views 301-308 initially arranged in the view array may be adjusted, depending upon actual design considerations. For brevity and simplicity, it is assumed that the triangular projection views 301-308 are sequentially arranged in the view array, such that the triangular projection views 301-308 are indexed by array indexes 0-7, respectively. An array index of a triangular projection view in the view array is used as an index of the triangular projection view that will be signaled via the bitstream BS. It should be noted that the triangular projection views arranged in the view array referenced by the control circuit 102 for view selection at the encoder side may be represented by unique numbers or unique symbols without being actually included in the view array. In other words, each array element in the view array is a unique number/symbol assigned to one of the triangular projection views 301-308. Hence, in the following description, a triangular projection view in the view array and a triangular projection view's unique number/symbol in the view array may be interchangeable. In addition, an order of setting the triangular projection faces may be adjusted, depending upon actual design considerations. For brevity and simplicity, it is assumed that the triangular projection faces at the positions P0-P7 are set by the control circuit 102 in order.

For the first position P0 with the position index i=0, the control circuit 102 determines which one of the triangular projection views 301-308 is selected to be filled into the triangular projection face located at the first position P0, determines which one of the rotation angles is selected for applying content rotation to the selected triangular projection view filled into the triangular projection face located at the first position P0, and sets the associated syntax elements view_index and layout_rotation. The syntax element view_index[i] indicates an index of the selected triangular projection view (e.g., an array index of the triangular projection view selected from the view array), and the syntax element layout_rotation[i] indicates a rotation angle of content rotation applied to the selected triangular projection view. The specification of the syntax element layout_rotation may be defined by the following table.

| layout_rotation [i] | rotation angle (counterclockwise) |
|---|---|
| 0 | 0° |
| 1 | +120° |
| 2 | +240° |

Hence, when the rotation angle of content rotation applied to a triangular projection view (which is an equilateral triangle) is 0°, the syntax element layout_rotation is set by 0; when the rotation angle of content rotation applied to a triangular projection view (which is an equilateral triangle) is +120° counterclockwise, the syntax element layout_rotation is set by 1; and when the rotation angle of content rotation applied to a triangular projection view (which is an equilateral triangle) is +240° counterclockwise, the syntax element layout_rotation is set by 2.

It should be noted that triangular projection faces at different positions in a triangle-based projection layout may be assigned with default rotation angles, such that content rotation with a default rotation angle is always applied to a triangular projection view filled into a triangular projection face assigned with the default rotation angle. Hence, a final rotation angle of content rotation applied to the triangular projection view filled into the triangular projection face assigned with the default rotation angle is equal to the default rotation angle plus the signaled rotation angle (i.e., the rotation angle indicated by the signaled syntax element layout_rotation). For example, regarding the octahedron projection layout 402 shown in FIG. 4, triangular projection faces at different positions P0-P7 may be assigned with the same default rotation angle (e.g., 0°). For another example, regarding an octahedron projection layout different from the octahedron projection layout 402 shown in FIG. 4, triangular projection faces at some positions may be assigned with a first default rotation angle (e.g., +60° counterclockwise), and triangular projection faces at some positions may be assigned with a second default rotation angle (e.g., −60° counterclockwise). The default rotation angles may be predefined and known by both of the video encoder 100 and the video decoder 200. Hence, syntax element signaling of default rotation angles may be omitted.

Supposing the control circuit 102 determines that the triangular projection view 304 is selected to be filled into the triangular projection face located at the first position P0 with the position index i=0 and determines that the rotation angle selected for applying content rotation to the selected triangular projection view 304 is +120° counterclockwise, the syntax element view_index[0] is set by three bits '011' that are indicative of the triangular projection view 304 indexed by the array index 3 in the view array, and the syntax element layout_rotation[0] is set by two bits '01' that are indicative of a rotation angle=+120° counterclockwise. After the syntax elements view_index[0] and layout_rotation[0] for the first position P0 with the position index i=0 are set, the triangular projection view 304 indexed by the array index 3 and kept in the view array may be marked as an unselectable array element.

For the second position P1 with the position index i=1, the control circuit 102 determines which one of the triangular projection views 301-303, 305-308 is selected to be filled into the triangular projection face located at the second position P1, determines which one of the rotation angles is selected for applying content rotation to the selected triangular projection view filled into the triangular projection face located at the second position P1, and sets the associated syntax elements view_index[1] and layout_rotation[1].

Supposing the control circuit 102 determines that the triangular projection view 302 is selected to be filled into the triangular projection face located at the second position P1 with the position index i=1, and determines that the rotation angle selected for applying content rotation to the selected triangular projection view 304 is 0°, the syntax element view_index[1] is set by three bits '001' that are indicative of the triangular projection view 302 indexed by the array index 1 in the view array, and the syntax element layout_rotation[1] is set by two bits '00' that are indicative of a rotation angle=0°. After the syntax elements view_index[1] and layout_rotation[1] for the second position P1 with the position index i=1 are set, the triangular projection view 302 indexed by the array index 1 and kept in the view array may be marked as an unselectable array element.

For the third position P2 with the position index i=2, the control circuit 102 determines which one of the triangular projection views 301, 303, 305-308 is selected to be filled into the triangular projection face located at the second position P2, determines which one of the rotation angles is selected for applying content rotation to the selected triangular projection view filled into the triangular projection face located at the second position P2, and sets the associated syntax elements view_index[2] and layout_rotation[2]. Supposing the control circuit 102 determines that the triangular projection view 301 is selected to be filled into the triangular projection face located at the second position P2 with the position index i=2 and determines that the rotation angle selected for applying content rotation to the selected triangular projection view 304 is +240° counterclockwise, the syntax element view_index[2] is set by three bits '000' that are indicative of the triangular projection view 301 indexed by the array index 0 in the view array, and the syntax element layout_rotation[2] is set by two bits '10' that are indicative of a rotation angle=+240° counterclockwise. After the syntax elements view_index[2] and layout_rotation[2] for the third position P2 with the position index i=2 are set, the triangular projection view 301 indexed by the array index 0 and kept in the view array may be marked as an unselectable array element.

The triangular projection faces at the positions P0-P7 are set by the control circuit 102 in order. Suppose that the remaining selectable array elements are triangular projection view 305 indexed by the array index 4 in the view array and triangular projection view 308 indexed by the array index 7 in the view array after the syntax elements view_index[5] and layout_rotation[5] for the fifth position P5 with the position index i=5 are set. For the seventh position P6 with the position index i=6, the control circuit 102 determines which one of the triangular projection views 305, 308 is selected to be filled into the triangular projection face located at the seventh position P6, determines which one of the rotation angles is selected for applying content rotation to the selected triangular projection view filled into the triangular projection face located at the seventh position P6, and sets the associated syntax elements view_index[6] and layout_rotation[6]. Supposing the control circuit 102 determines that the triangular projection view 305 is selected to be filled into the triangular projection face located at the seventh position P6 with the position index i=6, and determines that the rotation angle selected for applying content rotation to the selected triangular projection view 304 is +240° counterclockwise, the syntax element view_index[6] is set by three bits '100' that are indicative of the triangular projection view 305 indexed by the array index 4 in the view array, and the syntax element layout_rotation[6] is set by two bits '10' that are indicative of a rotation angle=+240° counterclockwise. After the syntax elements view_index[6] and layout_rotation[6] for the seventh position P6 with the position index i=6 are set, the triangular projection view 305 indexed by the array index 4 and kept in the view array may be marked as an unselectable array element.

Since there is only one selectable array element (e.g., triangular projection view 308) in the view array, it can be inferred to be the triangular projection view selected to be filled into the triangular projection face located at the last position (i.e., eighth position P7 with the position index i=7). For the eighth position P7 with the position index i=7, the control circuit 102 does not need to set the syntax element view_index, such that no syntax element view_index indicative of an index of a remaining triangular projection view filled into a corresponding triangular projection face located at the eighth position P7 with the position index i=7 is signaled via the bitstream BS. In this way, the coding efficiency can be improved.

For the eighth position P7 with the position index i=7, the control circuit 102 still needs to determine which one of the rotation angles is selected for applying content rotation to the selected triangular projection view filled into the triangular projection face located at the eighth position P7, and sets the associated syntax element layout_rotation[7]. Supposing that the control circuit 102 determines that the rotation angle selected for applying content rotation to the selected triangular projection view 308 is +120° counterclockwise, the syntax element layout_rotation[7] is set by two bits '01' that are indicative of a rotation angle=+120° counterclockwise.

The fixed-length syntax elements view_index[0]-view_index[6] indicative of indexes of triangular projection faces at positions P0-P6 and the fixed-length syntax elements layout_rotation[0]-layout_rotation[7] indicative of rotation angles of content rotation applied to the triangular projection faces at positions P0-P7 are signaled to a video decoder (e.g., video decoder 200) via the bitstream BS. Hence, the entropy decoding circuit 202 can apply data processing (e.g., syntax parsing) to the bitstream BS for deriving the signaled syntax elements view_index[0]-view_index[6] and layout_rotation[0]-layout_rotation[7] from the bitstream BS. The obtained syntax elements view_index[0]-view_index[6] and layout_rotation[0]-layout_rotation[7] are supplied to the control circuit 230.

Like the control circuit 102 of the video encoder 102, the control circuit 230 of the video decoder 200 builds an initial view array of triangular projection views 301-308 in a predefined order same as that employed by the control circuit 102. In this example, the selectable triangular projection views 301-308 are sequentially arranged in the initial view array, such that the selectable triangular projection views 301-308 are indexed by array indexes 0-7, respectively. It should be noted that the triangular projection views arranged in the view array referenced by the control circuit 230 for view determination at the decoder side may be represented by unique numbers or unique symbols without being actually included in the view array. In other words, each array element in the view array is a unique number/symbol assigned to one of the triangular projection views 301-308. Hence, in the following description, a triangular projection view in the view array and a triangular projection view's unique number/symbol in the view array may be interchangeable.

Like the control circuit 102 of the video encoder 102, the control circuit 230 of the video decoder 200 determines the triangle projection faces located at positions P0-P7 in order. Hence, the control circuit 230 refers to the syntax elements view_index[0]-view_index[6] to determine the triangle projection faces located at positions P0-P7. After one syntax element view_index[i] is used to determine which one of the triangle projection views 301-308 is filled into a triangle projection face located at a position [i] in the octahedron projection layout 402, the triangle projection view with an array index specified by the syntax element view_index[i] is marked as an unselectable array element in the view array. After all of the syntax elements view_index[0]-view_index[6] are used to determine triangle projection faces located at positions P0-P6, the control circuit 230 determines that the remaining selectable triangle projection available in the view array is the triangle projection view filled into a remaining triangle projection face located at the last position P7 in the octahedron projection layout 402. In addition, the control circuit 230 refers to the syntax elements layout_rotation[0]-layout_rotation[7] to determine the rotation angles of content rotation applied to the triangle projection faces located at the positions P0-P7 in the octahedron projection layout 402. It should be noted that triangle projection faces located at the positions P0-P7 may be further assigned with default rotation angles, respectively. Hence, a final rotation angle of content rotation applied to a triangular projection view filled into a triangular projection face assigned with a default rotation angle is equal to the default rotation angle plus the signaled rotation angle (i.e., the rotation angle indicated by the signaled syntax element layout_rotation).

In the example shown in FIG. 5, all of the syntax elements view_index[0]-view_index[6] indicative of indexes of triangular projection faces at positions P0-P6 have the same bit length (e.g., 3). However, this is for illustrative purposes only, and is not meant to be a limitation of the present invention. Alternatively, some of the syntax elements view_index[0]-view_index[6] indicative of indexes of triangular projection faces at positions P0-P6 may have different bit lengths. In this way, the coding efficiency can be further improved.

Figure 6:
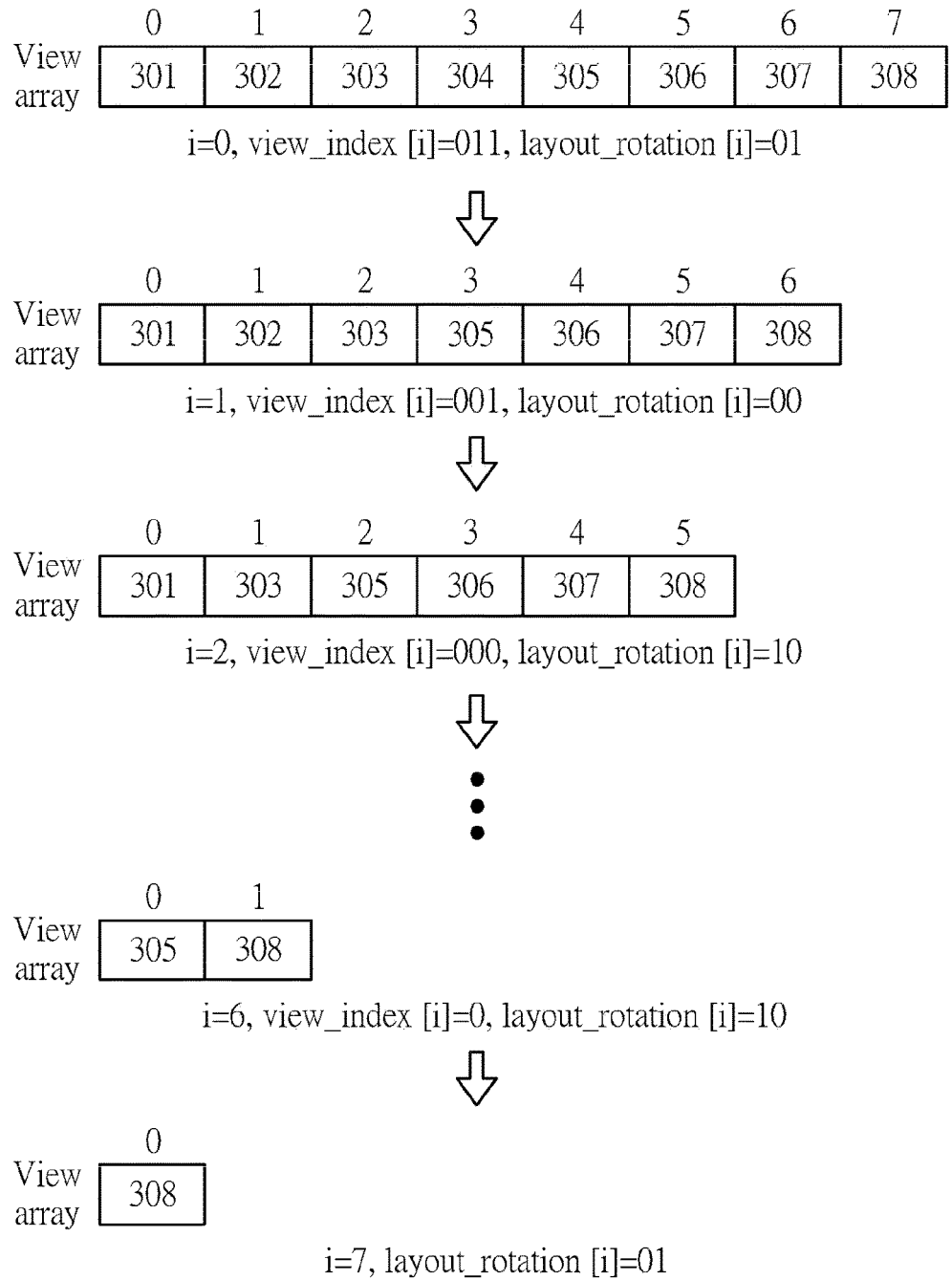
FIG. 6 is a diagram illustrating another procedure of setting the configuration of the octahedron projection layout according to an embodiment of the present invention.

FIG. 6 is a diagram illustrating another procedure of setting the configuration of the octahedron projection layout 402 according to an embodiment of the present invention. Initially, the control circuit 102 builds a view array of triangular projection views 301-308 in a predefined order. An order of the triangular projection views 301-308 initially arranged in the view array may be adjusted, depending upon actual design considerations. For brevity and simplicity, it is assumed that the triangular projection views 301-308 are sequentially arranged in the view array, such that the triangular projection views 301-308 are indexed by array indexes 0-7, respectively. An array index of a triangular projection view in the view array is used as an index of the triangular projection view that will be signaled via the bitstream BS. An order of setting the triangular projection faces may be adjusted, depending upon actual design considerations. For brevity and simplicity, it is assumed that the triangular projection faces at the positions P0-P7 are set by the control circuit 102 in order.

For the first position P0 with the position index i=0, the control circuit 102 determines which one of the triangular projection views 301-308 is selected to be filled into the triangular projection face located at the first position P0, determines which one of the rotation angles is selected for applying content rotation to the selected triangular projection view filled into the triangular projection face located at the first position P0, and sets the syntax elements view_index[0] and layout_rotation[0]. The syntax element view_index[i] indicates an index of the selected triangular projection view (e.g., an array index of the triangular projection view in the view array), and the syntax element layout_rotation[i] indicates a rotation angle of content rotation applied to the selected triangular projection view. Since the number of array elements in the view array is 8, at least three bits are needed to set the syntax element view_index[0]. Supposing the control circuit 102 determines that the triangular projection view 304 is selected to be filled into the triangular projection face located at the first position P0 with the position index i=0, and determines that the rotation angle selected for applying content rotation to the selected triangular projection view 304 is +120° counterclockwise, the syntax element view_index[0] is set by three bits '011' that are indicative of the triangular projection view 304 indexed by the array index 3 in the initial view array, and the syntax element layout_rotation[0] is set by two bits '01' that are indicative of a rotation angle=+120° counterclockwise. After the syntax elements view_index[0] and layout_rotation[0] for the first position P0 with the position index i=0 are set, the selected triangular projection view 304 is removed from the view array. Hence, the triangular projection views 301-303, 305-308 are sequentially arranged in the updated view array, such that the triangular projection views 301-303, 305-308 are indexed by array indexes 0-6, respectively.

For the second position P1 with the position index i=1, the control circuit 102 determines which one of the triangular projection views 301-303, 305-308 is selected to be filled into the triangular projection face located at the second position P1, determines which one of the rotation angles is selected for applying content rotation to the selected triangular projection view filled into the triangular projection face located at the second position P1, and sets the associated syntax elements view_index[1] and layout_rotation[1]. Since the number of array elements in the view array is 7, at least three bits are needed to set the syntax element view_index[1]. Supposing the control circuit 102 determines that the triangular projection view 302 is selected to be filled into the triangular projection face located at the second position P1 with the position index i=1, and determines that the rotation angle selected for applying content rotation to the selected triangular projection view 304 is 0°, the syntax element view_index[1] is set by three bits '001' that are indicative of the triangular projection view 302 indexed by the array index 1 in the updated view array, and the syntax element layout_rotation[i] is set by two bits '00' that are indicative of a rotation angle=00. After the syntax elements view_index[1] and layout_rotation[1] for the second position P1 with the position index i=1 are set, the selected triangular projection view 302 is removed from the view array. Hence, the triangular projection views 301, 303, 305-308 are sequentially arranged in the updated view array, such that the triangular projection views 301, 303, 305-308 are indexed by array indexes 0-5, respectively.

For the third position P2 with the position index i=2, the control circuit 102 determines which one of the triangular projection views 301, 303, 305-308 is selected to be filled into the triangular projection face located at the second position P2, determines which one of the rotation angles is selected for applying content rotation to the selected triangular projection view filled into the triangular projection face located at the second position P2, and sets the associated syntax elements view_index[2] and layout_rotation[2]. Since the number of array elements in the view array is 6, at least three bits are needed to set the syntax element view_index[2]. Supposing the control circuit 102 determines that the triangular projection view 301 is selected to be filled into the triangular projection face located at the second position P2 with the position index i=2, and determines that the rotation angle selected for applying content rotation to the selected triangular projection view 304 is +240° counterclockwise, the syntax element view_index[2] is set by three bits '000' that are indicative of the triangular projection view 301 indexed by the array index 0 in the updated view array, and the syntax element layout_rotation[2] is set by two bits '10' that are indicative of a rotation angle=+240° counterclockwise. After the syntax elements view_index[2] and layout_rotation[2] for the third position P2 with the position index i=2 are set, the selected triangular projection view 301 is removed from the view array, thus resulting in an updated view array having five array elements.

The triangular projection faces at the positions P0-P7 are set by the control circuit 102 in order. Hence, when the number of array elements remaining in an updated view array is larger than 2 and smaller than 5, two bits can be used to set the syntax element view_index[i], where 4≤i≤5; and when the number of array elements remaining in an updated view array is smaller than 3, one bit can be used to set the syntax element view_index[i], where i=6. Suppose that the remaining array elements are triangular projection views 305 and 308 after the syntax elements view_index[5] and layout_rotation[5] for the fifth position P5 with the position index i=5 are set. The triangular projection views 305 and 308 are sequentially arranged in the updated view array, such that the triangular projection views 305 and 308 are indexed by array indexes 0 and 1, respectively. For the seventh position P6 with the position index i=6, the control circuit 102 determines which one of the triangular projection views 305, 308 is selected to be filled into the triangular projection face located at the second position P6, determines which one of the rotation angles is selected for applying content rotation to the selected triangular projection view filled into the triangular projection face located at the seventh position P6, and sets the associated syntax elements view_index[6] and layout_rotation[6]. Since the number of array elements in the view array is 2, one bit can be used to set the syntax element view_index[6]. Supposing the control circuit 102 determines that the triangular projection view 305 is selected to be filled into the triangular projection face located at the seventh position P6 with the position index i=6, and determines that the rotation angle selected for applying content rotation to the selected triangular projection view 304 is +240° counterclockwise, the syntax element view_index[6] is set by one bit '0' that is indicative of the triangular projection view 305 indexed by the array index 0 in the updated view array, and the syntax element layout_rotation[6] is set by two bits '10' that are indicative of a rotation angle=+240° counterclockwise. After the syntax elements view_index[6] and layout_rotation[6] for the seventh position P6 with the position index i=6 are set, the selected triangular projection view 305 is removed from the view array, resulting in an updated view array having only one array element (i.e., triangular projection view 308).

Since the remaining selectable array element is the triangular projection view 308 indexed by the array index 0 in the view array only, it can be inferred to be the triangular projection view selected to be filled into the triangular projection face located at the last position (i.e., eighth position P7 with the position index i=7). For the eighth position P7 with the position index i=7, the control circuit 102 does not need to set the syntax element view_index, such that no syntax element view_index indicative of an index of a remaining triangular projection view filled into a corresponding triangular projection face located at the eighth position P7 with the position index i=7 is signaled via the bitstream BS. For the eighth position P7 with the position index i=7, the control circuit 102 still needs to determine which one of the rotation angles is selected for applying content rotation to the selected triangular projection view filled into the triangular projection face located at the eighth position P7, and sets the associated syntax element layout_rotation[7]. Supposing the control circuit 102 determines that the rotation angle selected for applying content rotation to the selected triangular projection view 308 is +120° counterclockwise, the syntax element layout_rotation[7] is set by two bits '01' that are indicative of a rotation angle=+120° counterclockwise.

The variable-length syntax elements view_index[0]-view_index[6] indicative of indexes of triangular projection faces at positions P0-P6 and the fixed-length syntax elements layout_rotation[0]-layout_rotation[7] indicative of rotation angles of content rotation applied to the triangular projection faces at positions P0-P7 are signaled to a video decoder (e.g., video decoder 200) via the bitstream BS. Hence, the entropy decoding circuit 202 can apply data processing (e.g., syntax parsing) to the bitstream BS for deriving the signaled syntax elements view_index[0]-view_index[6] and layout_rotation[0]-layout_rotation[7] from the bitstream BS. The obtained syntax elements view_index[0]-view_index[6] and layout_rotation[0]-layout_rotation[7] are supplied to the control circuit 230.

Like the control circuit 102 of the video encoder 102, the control circuit 230 of the video decoder 200 builds an initial view array of triangular projection views 301-308 in a predefined order same as that employed by the control circuit 102. In this example, the selectable triangular projection views 301-308 are sequentially arranged in the initial view array, such that the selectable triangular projection views 301-308 are indexed by array indexes 0-7, respectively. Like the control circuit 102 of the video encoder 102, the control circuit 230 of the video decoder 200 determines the triangle projection faces located at positions P0-P7 in order. Hence, the control circuit 230 refers to the syntax elements view_index[0]-view_index[6] to determine the triangle projection faces located at positions P0-P7. After one syntax element view_index[i] is used to determine which one of the triangle projection views 301-308 is filled into a triangle projection face located at a position [i] in the octahedron projection layout 402, the triangle projection view with an array index specified by the syntax element view_index[i] is removed from the view array, thus resulting in an updated view array with a reduced number of array elements. After all of the syntax elements view_index[0]-view_index[6] are used to determine triangle projection faces located at positions P0-P6, the control circuit 230 determines that the remaining selectable triangle projection available in the updated view array is the triangle projection view filled into a triangle projection face located at the last position P7 in the octahedron projection layout 402. In addition, the control circuit 230 refers to the syntax elements layout_rotation[0]-layout_rotation[7] to determine the rotation angles of content rotation applied to the triangle projection faces located at the positions P0-P7 in the octahedron projection layout 402. It should be noted that triangle projection faces located at the positions P0-P7 may be further assigned with default rotation angles, respectively. Hence, a final rotation angle of content rotation applied to a triangular projection view filled into a triangular projection face assigned with a default rotation angle is equal to the default rotation angle plus the signaled rotation angle (i.e., the rotation angle indicated by the signaled syntax element layout_rotation).

In the examples shown in FIG. 5 and FIG. 6, the control circuit 102 determines the mapping between the triangular projection views 301-308 shown in FIG. 3 and the triangular projection faces located at different positions P0-P7 shown in FIG. 4, and further determines the rotation angles of content rotation applied to the triangular projection views 301-308 filled into the triangular projection faces; and the encoding circuit 104 signals the syntax elements view_index[0]-view_index[6] and layout_rotation[0]-layout_rotation[7] associated with the final configuration of the octahedron projection layout 402 to a video decoder (e.g., video decoder 200) via the bitstream BS. However, this is for illustrative purposes only, and is not meant to be a limitation of the present invention.

In a first alternative design, the control circuit 102 determines the mapping between the triangular projection views 301-308 shown in FIG. 3 and the triangular projection faces located at different positions P0-P7 shown in FIG. 4, and the encoding circuit 104 signals the syntax elements view_index[0]-view_index[6] associated with the final configuration of the octahedron projection layout 402 to a video decoder (e.g., video decoder 200) via the bitstream BS. However, the rotation angles of content rotation applied to the triangular projection views 301-308 filled into the triangular projection faces are predefined and known by both of the video encoder 100 and the video decoder 200, such that the encoding circuit 104 does not need to signal the syntax elements layout_rotation[0]-layout_rotation[7] to the video decoder 200 via the bitstream BS.

In a second alternative design, the control circuit 102 determines the rotation angles of content rotation applied to the triangular projection views 301-308 filled into the triangular projection faces, and the encoding circuit 104 signals the syntax elements layout_rotation[0]-layout_rotation[7] associated with the final configuration of the octahedron projection layout 402 to a video decoder (e.g., video decoder 200) via the bitstream BS. However, the mapping between the triangular projection views 301-308 shown in FIG. 3 and the triangular projection faces located at different positions P0-P7 shown in FIG. 4 is predefined and known by both of the video encoder 100 and video decoder 200, such that the encoding circuit 104 does not need to signal the syntax elements view_index[0]-view_index[6] to the video decoder 200 via the bitstream BS.

In aforementioned syntax element signaling examples, the control circuit 102 does not set the syntax element view_index for the last position (e.g., eighth position P7 with the position index i=7), such that no syntax element view_index indicative of an index of a remaining triangular projection view filled into a corresponding triangular projection face located at the last position (e.g., eighth position P7 with position index i=7) is signaled via the bitstream BS. However, this is for illustrative purposes only, and is not meant to be a limitation of the present invention. Alternatively, the control circuit 102 may further set the syntax element view_index for the last position (e.g., eighth position P7 with the position index i=7), such that a syntax element view_index indicative of an index of a remaining triangular projection view filled into a corresponding triangular projection face located at the last position (e.g., eighth position P7 with position index i=7) is also signaled via the bitstream BS. Hence, the fixed-length syntax elements view_index[0]-view_index[7] (or variable-length syntax elements view_index[0]-view_index[7]) indicative of indexes of triangular projection faces at positions P0-P7 and the fixed-length syntax elements layout_rotation[0]-layout_rotation[7] indicative of rotation angles of content rotation applied to the triangular projection faces at positions P0-P7 are signaled to a video decoder (e.g., video decoder 200) via the bitstream BS. The entropy decoding circuit 202 can apply data processing (e.g., syntax parsing) to the bitstream BS for deriving the signaled syntax elements view_index[0]-view_index[7] and layout_rotation[0]-layout_rotation[7] from the bitstream BS. The obtained syntax elements view_index[0]-view_index[7] and layout_rotation[0]-layout_rotation[7] are supplied to the control circuit 230.

Figure 7:
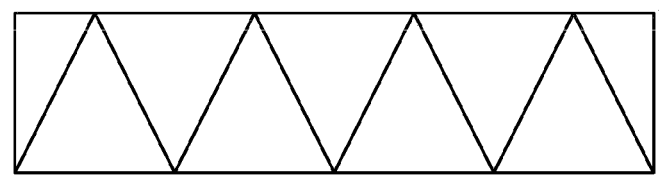
FIG. 7 is a diagram illustrating another octahedron projection layout according to an embodiment of the present invention.
Figure 8:
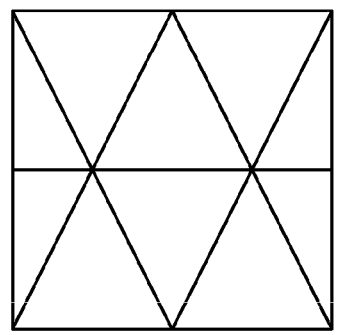
FIG. 8 is a diagram illustrating yet another octahedron projection layout according to an embodiment of the present invention.

An octahedron projection layout with a particular arrangement of triangular projection faces as illustrated in FIG. 4 is for illustrative purposes only, and is not meant to be a limitation of the present invention. The same concept of setting an octahedron projection layout by determining the mapping between triangular projection views and triangular projection faces located at different positions in the octahedron projection layout and/or the rotation angles of content rotation applied to the triangular projection views filled into the triangular projection faces may also be applied to other octahedron projection layouts with different particular arrangements of triangular projection faces, as shown in FIG. 7 and FIG. 8. It should be noted that only two alternative octahedron projection layouts are shown in FIGS. 7-8 for illustrative purposes only. In practice, any 360 VR projection layout with triangle projection faces can be configured by the proposed video encoder 100, where the associated syntax elements can be signaled to the proposed video decoder 200.

For example, the same concept of setting an octahedron projection layout by determining the mapping between triangular projection views and triangular projection faces located at different positions in the octahedron projection layout and/or the rotation angles of content rotation applied to the triangular projection views filled into the triangular projection faces may also be applied to other triangle-based projection layouts such as a tetrahedron projection layout, an icosahedron projection layout, a tetragon quartz-based projection layout, and a hexagon quartz-based projection layout.

Figure 9:
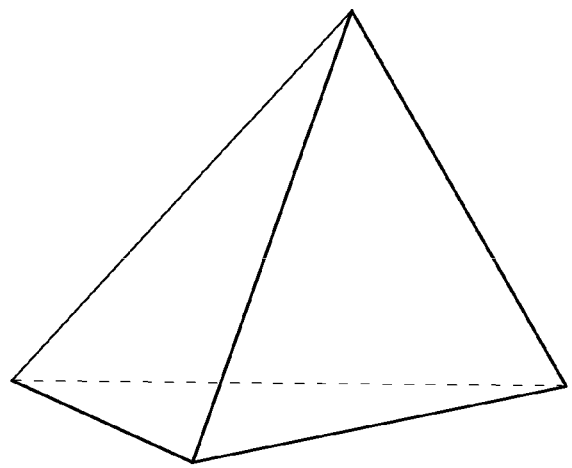
FIG. 9 is a diagram illustrating triangular projection views that will be filled into triangular projection faces of a tetrahedron projection layout under control of the control circuit shown in FIG. 1.
Figure 10:
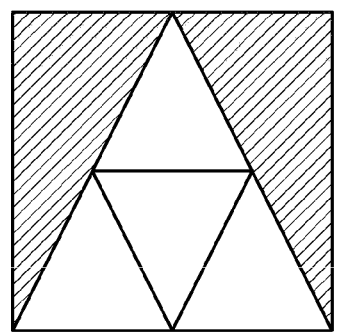
FIG. 10 is a diagram illustrating a tetrahedron projection layout according to an embodiment of the present invention.

FIG. 9 is a diagram illustrating triangular projection views that will be filled into triangular projection faces of a tetrahedron projection layout under control of the control circuit 102 shown in FIG. 1. FIG. 10 is a diagram illustrating a tetrahedron projection layout according to an embodiment of the present invention. The frame IMG to be encoded has a 360-degree image content represented by the triangular projection faces arranged in the tetrahedron projection layout. The control circuit 102 of the video encoder 100 sets the tetrahedron projection layout by determining the mapping between triangular projection views and triangular projection faces located at different positions in the tetrahedron projection layout, and/or sets the rotation angles of content rotation applied to the triangular projection views filled into the triangular projection faces.

In addition, the entropy encoding circuit 114 of the video encoder 100 signals syntax elements (e.g., view_index and/or layout_rotation) associated with the final configuration of the tetrahedron projection layout set by the control circuit 102 to a video decoder (e.g., video decoder 200) via the bitstream BS. Regarding the video decoder 200, the entropy decoding circuit 202 obtains the signaled syntax elements (e.g., view_index and/or layout_rotation) from the bitstream BS, and the control circuit 230 refers to the obtained syntax elements (e.g., view_index and/or layout_rotation) to determine the configuration of the tetrahedron projection layout set by the control circuit 102.

Figure 11:
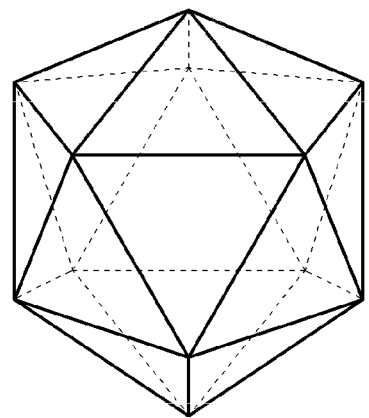
FIG. 11 is a diagram illustrating triangular projection views that will be filled into triangular projection faces of an icosahedron projection layout under control of the control circuit shown in FIG. 1.
Figure 12:
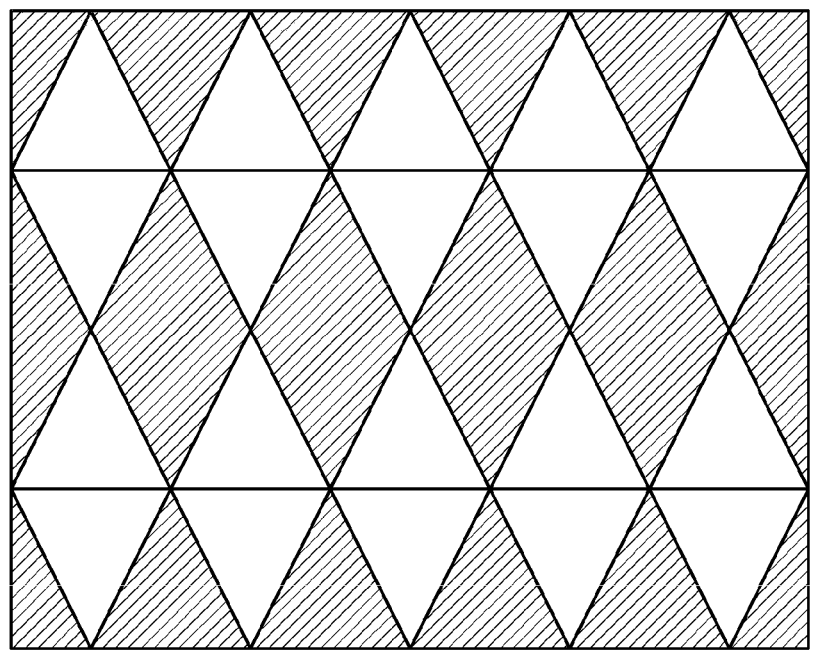
FIG. 12 is a diagram illustrating an icosahedron projection layout according to an embodiment of the present invention.

FIG. 11 is a diagram illustrating triangular projection views that will be filled into triangular projection faces of an icosahedron projection layout under control of the control circuit 102 shown in FIG. 1. FIG. 12 is a diagram illustrating an icosahedron projection layout according to an embodiment of the present invention. The frame IMG to be encoded has a 360-degree image content represented by the triangular projection faces arranged in the icosahedron projection layout. The control circuit 102 of the video encoder 100 sets the icosahedron projection layout by determining the mapping between triangular projection views and triangular projection faces located at different positions in the icosahedron projection layout, and/or sets the rotation angles of content rotation applied to the triangular projection views filled into the triangular projection faces. In addition, the entropy encoding circuit 114 of the video encoder 100 signals syntax elements (e.g., view_index and/or layout_rotation) associated with the final configuration of the icosahedron projection layout set by the control circuit 102 to a video decoder (e.g., video decoder 200) via the bitstream BS. Regarding the video decoder 200, the entropy decoding circuit 202 obtains the signaled syntax elements (e.g., view_index and/or layout_rotation) from the bitstream BS, and the control circuit 230 refers to the obtained syntax elements (e.g., view_index and/or layout_rotation) to determine the configuration of the icosahedron projection layout set by the control circuit 102.

Figure 13:
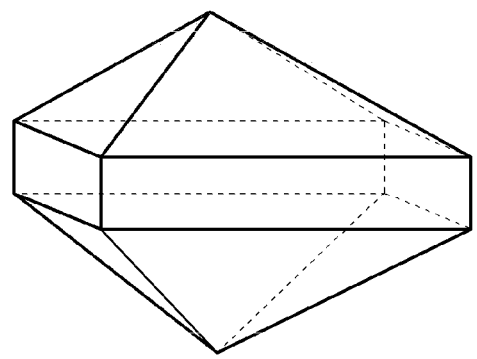
FIG. 13 is a diagram illustrating projection views that will be filled into projection faces of a tetragon quartz-based projection layout under control of the control circuit shown in FIG. 1.
Figure 14:
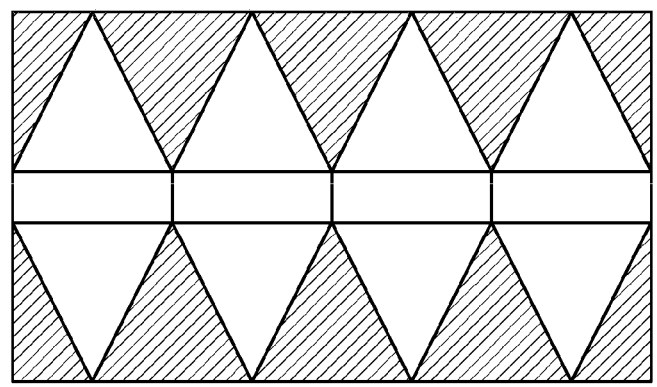
FIG. 14 is a diagram illustrating a tetragon quartz-based layout according to an embodiment of the present invention.

FIG. 13 is a diagram illustrating projection views that will be filled into projection faces of a tetragon quartz-based projection layout under control of the control circuit 102 shown in FIG. 1. FIG. 14 is a diagram illustrating a tetragon quartz-based layout according to an embodiment of the present invention. The frame IMG to be encoded has a 360-degree image content represented by the projection faces (which include triangular projection faces) arranged in the tetragon quartz-based projection layout. Settings of the tetragon quartz-based projection layout that are determined by the control circuit 102 of the video encoder 100 include the mapping between triangular projection views and triangular projection faces located at different positions in the tetragon quartz-based projection layout and/or the rotation angles of content rotation applied to the triangular projection views filled into the triangular projection faces. In addition, the entropy encoding circuit 114 of the video encoder 100 signals syntax elements (e.g., view_index and/or layout_rotation) associated with the final configuration of the tetragon quartz-based projection layout set by the control circuit 102 to a video decoder (e.g., video decoder 200) via the bitstream BS. Regarding the video decoder 200, the entropy decoding circuit 202 obtains the signaled syntax elements (e.g., view_index and/or layout_rotation) from the bitstream BS, and the control circuit 230 refers to the obtained syntax elements (e.g., view_index and/or layout_rotation) to determine the configuration of the tetragon quartz-based projection layout set by the control circuit 102.

Figure 15:
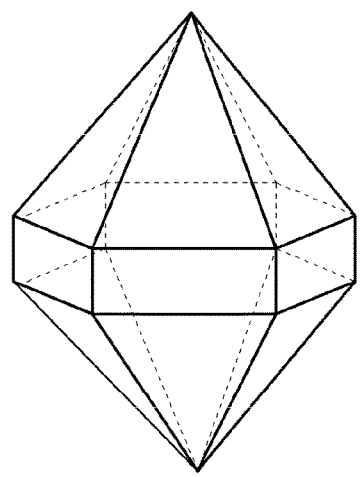
FIG. 15 is a diagram illustrating projection views that will be filled into projection faces of a hexagon quartz-based projection layout under control of the control circuit shown in FIG. 1.
Figure 16:
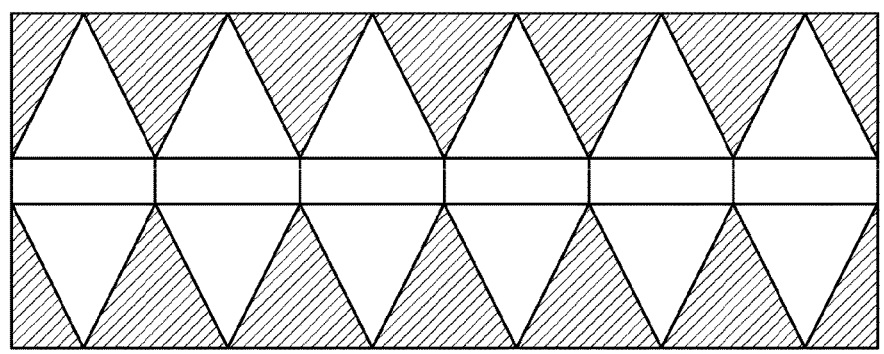
FIG. 16 is a diagram illustrating a hexagon quartz-based projection layout according to an embodiment of the present invention.

FIG. 15 is a diagram illustrating projection views that will be filled into projection faces of a hexagon quartz-based projection layout under control of the control circuit 102 shown in FIG. 1. FIG. 16 is a diagram illustrating a hexagon quartz-based projection layout according to an embodiment of the present invention. The frame IMG to be encoded has a 360-degree image content represented by the projection faces (which include triangular projection faces) arranged in the hexagon quartz-based projection layout. Settings of the hexagon quartz-based projection layout that are determined by the control circuit 102 of the video encoder 100 include the mapping between triangular projection views and triangular projection faces located at different positions in the hexagon quartz-based projection layout and/or the rotation angles of content rotation applied to the triangular projection views filled into the triangular projection faces. In addition, the entropy encoding circuit 114 of the video encoder 100 signals syntax elements (e.g., view_index and/or layout_rotation) associated with the final configuration of the hexagon quartz-based projection layout set by the control circuit 102 to a video decoder (e.g., video decoder 200) via the bitstream BS. Regarding the video decoder 200, the entropy decoding circuit 202 obtains the signaled syntax elements (e.g., view_index and/or layout_rotation) from the bitstream BS, and the control circuit 230 refers to the obtained syntax elements (e.g., view_index and/or layout_rotation) to determine the configuration of the hexagon quartz-based projection layout set by the control circuit 102.

In accordance with aforementioned embodiments of the flexible video encoder design, the control circuit 102 may be used to set a 360 VR projection layout (e.g., a tetrahedron projection layout, an octahedron projection layout, an icosahedron projection layout, a tetragon quartz-based projection layout, or a hexagon quartz-based projection layout) by actively setting the mapping between triangular projection views and triangular projection faces located at different positions in the 360 VR projection layout and/or the rotation angles of content rotation applied to the triangular projection views filled into the triangular projection faces of the 360 VR projection layout, and the entropy encoding circuit 114 may be used to signal syntax elements (e.g., view_index and/or layout_rotation) associated with the final configuration of the 360 VR projection layout set by the control circuit 102 to a video decoder (e.g., video decoder 200) via the bitstream BS. In one alternative design, one of a plurality of different predefined projection layouts each having a fixed configuration may be selected as a 360 VR projection layout, and a specific syntax element associated with the selected predefined projection layout may be signaled via the bitstream. In another alternative design, a predefined default projection layout having a fixed configuration may be selectively used as a 360 VR projection layout, and a specific syntax element indicative of selection/unselection of the predefined default projection layout may be signaled via the bitstream. It should be noted that each predefined projection layout is known by both of the video encoder 100 and the video decoder 200, and has a fixed configuration setting (e.g., fixed mapping between projection views and projection faces located at different positions in the predefined projection layout and fixed rotation angles of content rotation applied to the projection views filled into the projection faces of the predefined projection layout).

Figure 17:
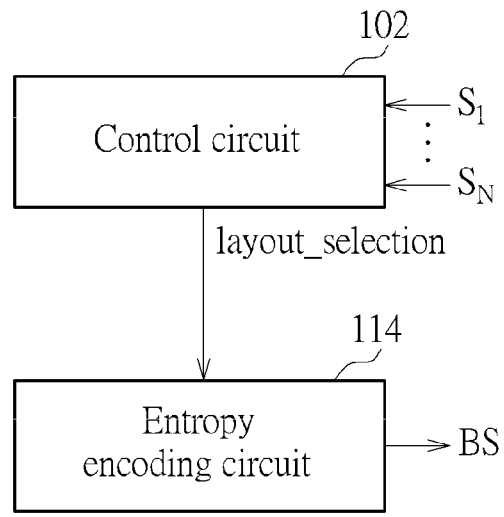
FIG. 17 is a diagram illustrating a part of the video encoder that supports a set of different predefined projection layouts according to an embodiment of the present invention.

FIG. 17 is a diagram illustrating a part of the video encoder 100 that supports a set of different predefined projection layouts according to an embodiment of the present invention. In this embodiment, a set of different predefined projection layouts $S_1$-$S_N$ is used by the control circuit 102. For example, each of the predefined projection layouts $S_1$-$S_N$ is a predefined triangle-based projection layout (e.g., a predefined tetrahedron projection layout, a predefined octahedron projection layout, a predefined icosahedron projection layout, a predefined tetragon quartz-based projection layout, or a predefined hexagon quartz-based projection layout) with triangular projection faces. The control circuit 102 selects a predefined projection layout from the different predefined projection layouts $S_1$-$S_N$, and uses the selected predefined projection layout as a 360 VR projection layout, where the frame IMG has a 360-degree image content represented by projection faces arranged in the 360 VR projection layout, and is encoded into the bitstream BS for transmission. In addition, the control circuit 102 sets a syntax element layout_selection to indicate selection of the predefined projection layout, where the syntax element layout_selection is signaled to a video decoder (e.g., video decoder 200) via the bitstream BS generated from the entropy encoding circuit 114.

Figure 18:
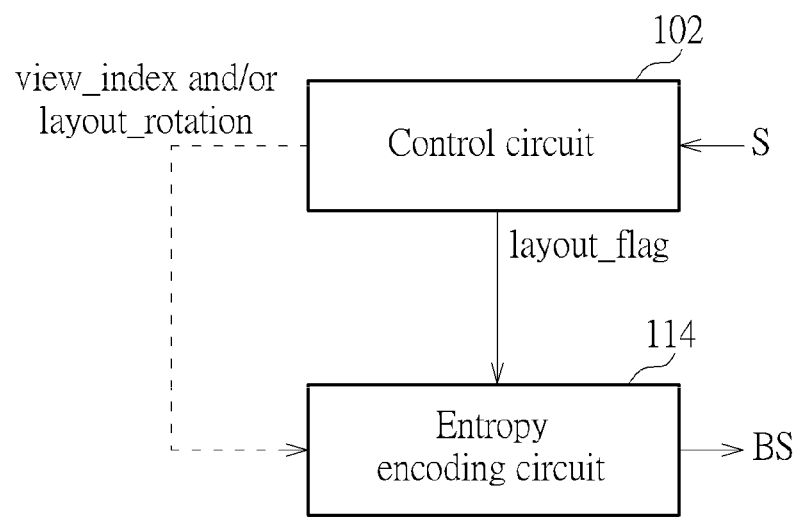
FIG. 18 is a diagram illustrating a part of the video encoder that supports a predefined default projection layout according to an embodiment of the present invention.

FIG. 18 is a diagram illustrating a part of the video encoder 100 that supports a predefined default projection layout according to an embodiment of the present invention. In this embodiment, a predefined default projection layout S is used by the control circuit 102. For example, the predefined default projection layout S is a predefined triangle-based projection layout (e.g., a predefined tetrahedron projection layout, a predefined octahedron projection layout, a predefined icosahedron projection layout, a predefined tetragon quartz-based projection layout, or a predefined hexagon quartz-based projection layout) with triangular projection faces. The control circuit 102 determines if the predefined default projection layout S should be selected as a 360 VR projection layout. In a case where the 360 VR projection layout is set by the predefined default projection layout S, the frame IMG has a 360-degree image content represented by projection faces arranged in the 360 VR projection layout, and is encoded into the bitstream BS for transmission. In addition, the control circuit 102 sets a syntax element layout_flag to indicate selection of the predefined default projection layout, where the syntax element layout_flag is signaled to a video decoder (e.g., video decoder 200) via the bitstream BS generated from the entropy encoding circuit 114.

In another case where the predefined default projection layout S is not selected to set the 360 VR projection layout, the control circuit 102 sets the 360 VR projection layout (e.g., a tetrahedron projection layout, an octahedron projection layout, an icosahedron projection layout, a tetragon quartz-based projection layout, or a hexagon quartz-based projection layout) by setting the mapping between triangular projection views and triangular projection faces located at different positions in the 360 VR projection layout and/or the rotation angles of content rotation applied to the triangular projection views filled into the triangular projection faces of the 360 VR projection layout. The frame IMG has a 360-degree image content represented by projection faces arranged in the 360 VR projection layout explicitly set by the control circuit 102, and is encoded into the bitstream BS for transmission. In addition, the control circuit 102 sets a syntax element layout_flag that indicates unselection of the predefined default projection layout, and further sets syntax elements (e.g., view_index and/or layout_rotation) associated with the final configuration of the 360 VR projection layout, where the syntax elements, including layout_flag, view_index and layout_rotation, or layout_flag and view_index, or layout_flag and layout_rotation, are signaled to a video decoder (e.g., video decoder 200) via the bitstream BS. Since a person skilled in the pertinent art can readily understand details of setting a configuration of a 360 VR projection layout after reading above paragraphs directed to examples in FIGS. 5-6, further description is omitted here for brevity.

Since syntax elements (e.g., layout_selection, layout_flag, view_index, and/or layout_rotation) associated with the configuration/selection of the 360 VR projection layout employed by the video encoder 100 are signaled to the video decoder 200, the video decoder 200 can refer to the signaled syntax elements (e.g., layout_selection, layout_flag, view_index, and/or layout_rotation) to know the configuration/selection of the 360 VR projection layout employed by the video encoder 100.

Figure 19:
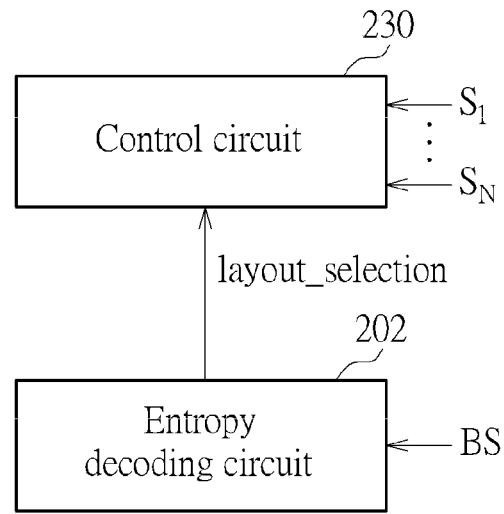
FIG. 19 is a diagram illustrating a part of the video decoder that supports a set of different predefined projection layouts according to an embodiment of the present invention.

FIG. 19 is a diagram illustrating a part of the video decoder 200 that supports a set of different predefined projection layouts according to an embodiment of the present invention. The bitstream BS received by the video decoder 200 is decoded to generate the decoded frame IMG' having a 360-degree image content represented by projection faces arranged in the 360 VR projection layout that is a predefined projection layout selected by the video encoder 100. In this embodiment, the same set of different predefined projection layouts $S_1$-$S_N$ shown in FIG. 17 is also used by the control circuit 230 of the video decoder 200. The entropy decoding circuit 202 processes the bitstream BS to obtain the syntax element layout_selection, and outputs the obtained syntax element layout_selection to the control circuit 230. Next, the control circuit 230 refers to the syntax element layout_selection to determine which one of the predefined projection layouts $S_1$-$S_N$ is the 360 VR projection layout used by the video encoder 100.

Figure 20:
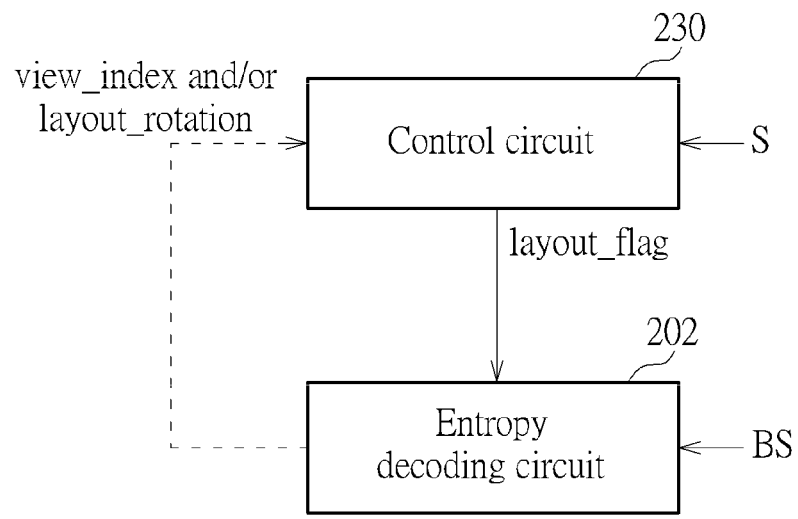
FIG. 20 is a diagram illustrating a part of the video decoder that supports a predefined default projection layout according to an embodiment of the present invention.

FIG. 20 is a diagram illustrating a part of the video decoder 200 that supports a predefined default projection layout according to an embodiment of the present invention. The bitstream BS received by the video decoder 200 is decoded to generate the decoded frame IMG' having a 360-degree image content represented by projection faces arranged in the 360 VR projection layout, where the 360 VR projection layout may be a predefined default projection layout when the predefined default projection layout is selected or may be explicitly set by the video encoder 100 when the predefined default projection layout is not selected. In this embodiment, the same predefined default projection layout S shown in FIG. 18 is also used by the control circuit 230 of the video decoder 200. The entropy decoding circuit 202 processes the bitstream BS to obtain the syntax element layout_flag, and outputs the obtained syntax element layout_flag to the control circuit 230. The control circuit 102 refers to the syntax element layout_flag to determine if the 360 VR projection layout is the predefined default projection layout S. In a case where the syntax element layout_flag indicates selection of the predefined default projection layout S, the control circuit 230 determines that the 360 VR projection layout is the predefined default projection layout S. In another case where the syntax element layout_flag indicates unselection of the predefined default projection layout S, the entropy decoding circuit 202 processes the bitstream BS to obtain additional syntax elements (e.g., view_index and/or layout_rotation), and outputs the obtained additional syntax elements (e.g., view_index and/or layout_rotation) to the control circuit 230. The control circuit 230 refers to the additional syntax elements (e.g., view_index and/or layout_rotation) to determine the configuration of the 360 VR projection layout used by the video encoder 100.

By way of example, but not limitation, the aforementioned syntax elements (e.g., layout_selection, layout_flag, view_index, and/or layout_rotation) associated with the configuration/selection of the 360 VR projection layout (e.g., a triangle-based projection layout) employed by the video encoder 100 may be signaled to the video decoder 200 at a sequence level, a view level, a picture level, a slice level, a tile level, an SPS (sequence parameter set) level, a VPS (video parameter set) level or an APS (adaptive parameter set) level.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A video encoding method comprising:
setting a 360-degree Virtual Reality (360 VR) projection layout of projection faces, wherein the projection faces comprise a plurality of triangular projection faces located at a plurality of positions in the 360 VR projection layout, respectively;
encoding a frame having a 360-degree image content represented by the projection faces arranged in the 360 VR projection layout to generate a bitstream; and
for each position included in at least a portion of the positions, signaling at least one syntax element via the bitstream, wherein the at least one syntax element is set to indicate at least one of an index of a triangular projection view filled into a corresponding triangular projection face located at said each position and a rotation angle of content rotation applied to the triangular projection view filled into the corresponding triangular projection face located at said each position.

2. The video encoding method of claim 1, wherein a number of the positions is N; the positions comprise (N−1) positions and a remaining position; for each of the (N−1) positions, a syntax element indicating an index of a triangular projection view filled into a corresponding triangular projection face located at said each of the (N−1) positions is signaled via the bitstream; and for the remaining position, no syntax element indicating an index of a remaining triangular projection view filled into a corresponding triangular projection face located at the remaining position is signaled via the bitstream.

3. The video encoding method of claim 1, wherein a number of the positions is N; and for each of M positions in the positions, a syntax element indicating an index of a triangular projection view filled into a corresponding triangular projection face located at said each of the M positions is signaled via the bitstream, where signaled syntax elements indicative of indexes for the M positions have a same bit length, and M=N or (N−1).

4. The video encoding method of claim 1, wherein for said each position included in said at least a portion of the positions, the triangular projection view filled into the corresponding triangular projection face located at said each position is selected from a view array of triangular projection views, and the index of the triangular projection view is set by an array index of the triangular projection view in the view array, wherein after the triangular projection view is selected for said each position, the view array is updated by removing the triangular projection view from the view array; syntax elements respectively indicating indexes of triangular projection views filled into corresponding triangular projection faces located at all positions in said at least a portion of the positions are signaled via the bitstream, and not all of the syntax elements have a same bit length.

5. The video encoding method of claim 1, wherein, for each of the positions, a syntax element indicating a rotation angle of content rotation applied to a triangular projection view filled into a corresponding triangular projection face located at said each of the positions is signaled via the bitstream.

6. The video encoding method of claim 5, wherein the rotation angle is selected from a group consisting of 0°, 120° and 240°.

7. A video encoding method comprising:
encoding a frame having a 360-degree image content represented by projection faces arranged in a 360-degree Virtual Reality (360 VR) projection layout to generate a bitstream, wherein the projection faces comprise a plurality of triangular projection faces; and
signaling a first syntax element via the bitstream, wherein when a predefined projection layout is selected and used as the 360 VR projection layout, the first syntax element is set to indicate selection of the predefined projection layout.

8. The video encoding method of claim 7, further comprising:
selecting the predefined projection layout from a set of different predefined projection layouts; and
setting the 360 VR projection layout by the predefined projection layout.

9. The video encoding method of claim 7, wherein the first syntax element is set to indicate that the predefined projection layout is not selected and used as the 360 VR projection layout, and the video encoding method further comprises:
setting the 360 VR projection layout, wherein the triangular projection faces are located at a plurality of positions in the 360 VR projection layout, respectively; and
for each position included in at least a portion of the positions, signaling at least one second syntax element via the bitstream, wherein the at least one second syntax element is set to indicate at least one of an index of a triangular projection view filled into a corresponding triangular projection face located at said each position and a rotation angle of content rotation applied to the triangular projection view filled into the corresponding triangular projection face located at said each position.

10. A video decoding method comprising:
receiving a bitstream;
processing the bitstream to obtain at least one syntax element for each position included in at least a portion of a plurality of positions;
referring to at least syntax elements obtained for said at least a portion of the positions to determine a 360-degree Virtual Reality (360 VR) projection layout of projection faces, wherein the projection faces comprise a plurality of triangular projection faces located at the positions in the 360 VR projection layout, respectively, and the at least one syntax element indicates at least one of an index of a triangular projection view filled into a corresponding triangular projection face located at said each position and a rotation angle of content rotation applied to the triangular projection view filled into the corresponding triangular projection face located at said each position; and
decoding the bitstream to generate a decoded frame having a 360-degree image content represented by the projection faces arranged in the 360 VR projection layout.

11. The video decoding method of claim 10, wherein a number of the positions is N; the positions comprise (N−1) positions and a remaining position; for each of the (N−1) positions, a syntax element indicating an index of a triangular projection view filled into a corresponding triangular projection face located at said each of the (N−1) positions is derived from the bitstream; and for the remaining position, no syntax element indicating an index of a remaining triangular projection view filled into a corresponding triangular projection face located at the remaining position is derived from the bitstream.

12. The video decoding method of claim 10, wherein a number of the positions is N; and for each of M positions in the positions, a syntax element indicating an index of a triangular projection view filled into a corresponding triangular projection face located at said each of the M positions is derived from the bitstream, where derived syntax elements indicative of indexes for the M positions have a same bit length, and M=N or (N−1).

13. The video decoding method of claim 10, wherein for said each position included in said at least a portion of the positions, the triangular projection view filled into the corresponding triangular projection face located at said each position is determined from a view array of triangular projection views, and an array index of the triangular projection view in the view array is determined by the index of the triangular projection view, wherein after the triangular projection view is determined for said each position, the view array is updated by removing the triangular projection view from the view array; syntax elements indicating indexes of triangular projection views filled into corresponding triangular projection faces located at all positions included in said at least a portion of the positions are derived from the bitstream, and not all of the derived syntax elements have a same bit length.

14. The video decoding method of claim 10, wherein, for each of the positions, a syntax element indicating a rotation angle of content rotation applied to a triangular projection view filled into a corresponding triangular projection face located at said each of the positions is derived from the bitstream.

15. The video decoding method of claim 14, wherein the rotation angle is selected from a group consisting of 0°, 120° and 240°.

16. A video decoding method comprising:
receiving a bitstream;
processing the bitstream to obtain a first syntax element;
referring to at least the first syntax element to determine a 360-degree Virtual Reality (360 VR) projection layout of projection faces, wherein the projection faces comprise a plurality of triangular projection faces, and when a predefined projection layout is selected and used as the 360 VR projection layout, the first syntax element indicates selection of the predefined projection layout; and
decoding the bitstream to generate a decoded frame having a 360-degree image content represented by the projection faces arranged in the 360 VR projection layout.

17. The video decoding method of claim 16, wherein referring to at least the first syntax element to determine the 360 VR projection layout of the projection faces comprises:
selecting the predefined projection layout from a set of different predefined projection layouts according to the first syntax element; and
determining that the 360 VR projection layout is the predefined projection layout.

18. The video decoding method of claim 16, wherein the first syntax element does not indicate selection of the predefined projection layout, and the video decoding method further comprises:
processing the bitstream to obtain at least one second syntax element for each position included in at least a portion of a plurality of positions, wherein the triangular projection faces are located at the positions, respectively, and the at least one second syntax element indicates at least one of an index of a triangular projection view filled into a corresponding triangular projection face located at said each position and a rotation angle of content rotation applied to the triangular projection view filled into the corresponding triangular projection face located at said each position;
referring to at least the first syntax element to determine the 360 VR projection layout of the projection faces further comprises:
referring to syntax elements obtained for said at least a portion of the positions to determine the 360 VR projection layout.

19. A video encoder comprising:
a control circuit, arranged to set a 360-degree Virtual Reality (360 VR) projection layout of projection faces, wherein the projection faces comprise a plurality of triangular projection faces located at a plurality of positions in the 360 VR projection layout, respectively; and
an encoding circuit, arranged to encode a frame having a 360-degree image content represented by the projection faces arranged in the 360 VR projection layout to generate a bitstream, wherein for each position included in at least a portion of the positions, the encoding circuit further signals at least one syntax element via the bitstream, where the at least one syntax element is set to indicate at least one of an index of a triangular projection view filled into a corresponding triangular projection face located at said each position and a rotation angle of content rotation applied to the triangular projection view filled into the corresponding triangular projection face located at said each position.

20. A video decoder comprising:
a decoding circuit, arranged to receive a bitstream, process the bitstream to obtain at least one syntax element for each position included in at least a portion of a plurality of positions, and decode the bitstream to generate a decoded frame having a 360-degree image content represented by projection faces arranged in a 360-degree Virtual Reality (360 VR) projection layout; and
a control circuit, arranged to refer to at least syntax elements obtained for said at least a portion of the positions to determine the 360 VR projection layout of the projection faces, wherein the projection faces comprise a plurality of triangular projection faces located at the positions in the 360 VR projection layout, respectively, and the at least one syntax element indicates at least one of an index of a triangular projection view filled into a corresponding triangular projection face located at said each position and a rotation angle of content rotation applied to the triangular projection view filled into the corresponding triangular projection face located at said each position.

* * * * *